(12) United States Patent
Murakami et al.

(10) Patent No.: US 7,059,214 B2
(45) Date of Patent: Jun. 13, 2006

(54) AUTOMATIC TRANSMISSION WITH ELECTRONIC CONTROL UNIT

(75) Inventors: Naotaka Murakami, Anjo (JP); Naoto Ogasawara, Anjo (JP); Kenji Suzuki, Anjo (JP); Kohichi Ichigo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 221 days.

(21) Appl. No.: 09/962,800

(22) Filed: Sep. 26, 2001

(65) Prior Publication Data

US 2002/0040620 A1 Apr. 11, 2002

(30) Foreign Application Priority Data

Sep. 27, 2000 (JP) .......... 2001-294989
Aug. 27, 2001 (JP) .......... 2001-256975

(51) Int. Cl.
*F16H 557/02* (2006.01)

(52) U.S. Cl. .................. 74/606 R; 439/587
(58) Field of Classification Search .......... 74/606 R; 277/608, 616, 626; 439/587, 589; 174/65 R
See application file for complete search history.

(56) References Cited

U.S. PATENT DOCUMENTS

| 2,801,395 | A | * | 7/1957 | Quackenbush | ......... 439/589 |
|---|---|---|---|---|---|
| 3,398,391 | A | * | 8/1968 | Brishka | ......... 439/559 |
| 3,795,883 | A | * | 3/1974 | Ackerman et al. | ......... 439/106 |
| 4,402,566 | A | * | 9/1983 | Powell et al. | ......... 439/589 |
| 4,684,190 | A | * | 8/1987 | Clark et al. | ......... 439/587 |
| 4,711,509 | A | * | 12/1987 | Cross et al. | ......... 439/587 |
| 4,812,133 | A | | 3/1989 | Fleak et al. | |
| 5,101,677 | A | | 4/1992 | Hammerschmitt | ......... 74/335 |
| 5,311,398 | A | * | 5/1994 | Schirmer et al. | ......... 174/52.2 |
| 5,857,864 | A | * | 1/1999 | Fukuda | ......... 439/275 |
| 5,902,150 | A | * | 5/1999 | Sigl et al. | ......... 439/587 |
| 6,155,137 | A | * | 12/2000 | Nassar et al. | ......... 74/606 R |
| 6,205,886 | B1 | * | 3/2001 | Takeuchi | ......... 74/606 R |
| 6,205,887 | B1 | * | 3/2001 | Barnreiter et al. | ......... 74/606 R |

FOREIGN PATENT DOCUMENTS

| DE | 3315900 | A1 | * | 2/1984 |
|---|---|---|---|---|
| JP | 2-256183 | | | 10/1990 |
| JP | 4-121685 | | | 10/1992 |
| JP | 5-196130 | | | 8/1993 |
| WO | WO 9729306 | A1 | * | 8/1997 |

* cited by examiner

*Primary Examiner*—David A. Bucci
*Assistant Examiner*—Timothy McAnulty
(74) *Attorney, Agent, or Firm*—Bacon & Thomas, PLLC

(57) ABSTRACT

In an electronic control unit, a transmission control module for controlling an automatic transmission and a position sensor for detecting the range position of the automatic transmission are built in a common unit case. A first member and a second member to be fitted at the time of mounting the electronic control unit on an automatic transmission case are directed in the mounting direction when mounted on the automatic transmission case, and a third member is mounted on those two members. A predetermined clearance is formed at a predetermined portion on the mounting path between the automatic transmission case and the third member. When the electronic control unit is mounted on the automatic transmission case, therefore, the clearance on the mounting path inbetween absorbs the positional deviation between the first member and the second member thereby to facilitate the mounting work. Thus, the mounting workability of a position sensor built-in electronic control unit on an automatic transmission is improved.

25 Claims, 7 Drawing Sheets

AUTOMATIC TRANSMISSION WITH ELECTRONIC CONTROL UNIT

BACKGROUND OF THE INVENTION

1. Field of the Invention

The present invention relates to a technique for integrating an electronic control unit with an automatic transmission and, more particularly, to a technique for mounting the electronic control unit in an electrically and mechanically connected state on the automatic transmission.

2. Description of the Related Art

As well known in the art, the automatic transmission to be mounted on a vehicle is controlled by operating its hydraulic control apparatus with a shift device and an electronic control unit. This electronic control unit is mounted in a vehicle compartment or an engine room, and a neutral start switch and a position sensor as electric parts for the controls are arranged on the outer side of an automatic transmission case whereas individual sensors for the engine speed or the oil temperature and solenoids are attached, although partially excepted, in the automatic transmission case. Moreover, the electric connections between the individual electric parts and the electronic control unit are effected by a wire harness as the vehicle wiring lines.

As the aforementioned vehicle wiring lines are shown conceptionally and schematically in FIG. 10, more specifically, the wiring lines of various sensors arranged in a transmission housing portion of the transmission case are collected by a wire harness a acting as the in-transmission wiring lines and led to the outside of the transmission case. Wiring lines b of solenoids attached to the valve body in the transmission case are individually led to the outside of the transmission case. Wiring lines d of a neutral switch integrated type position sensor c attached to the outer face of the transmission case wall is connected directly with an electronic control unit f through a wire harness e as the vehicle wiring lines.

With the wiring structure thus far described being adopted, numerous wire harnesses and connectors are required for the electric connections. This necessity makes it difficult to reduce the weight and the cost and raises problems in the large number of mounting design steps and the vehicle assembling steps. Moreover, the automatic transmission body and its electronic control unit are combined when mounted on the vehicle, thereby to make it difficult to manage the quality finely one-to-one while considering the delicate characteristic difference among the individuals. Moreover, the module is made to save the space for the individual arrangements of the various electric parts of the automatic transmission and the electronic control unit so that the space saving is not realized as a whole.

SUMMARY OF THE INVENTION

Therefore, the present invention has a first object to provide a wiring structure which can connect the various electric parts in the automatic transmission and the position sensor and/or the electronic control unit intensively. Next, the present invention has a second object to facilitate the integral quality management of the automatic transmission and its electronic control unit. Moreover, the present invention has a third object to realize the space saving arranged of the various electric parts in the automatic transmission and the position sensor and/or the electronic control unit as a whole.

Where the position sensor, the electronic control unit and the automatic transmission are integrated, it is necessary, if premising the existing construction in which the position sensor is mechanically fitted on a manual shaft, to insert both the manual shaft for connecting the electronic control unit and the automatic transmission mechanically and the connectors for connecting them electrically into the automatic transmission case when the electronic control unit is mounted on the automatic transmission. If these operations are simultaneously done, there is needed means for improving the workability. Therefore, the present invention has a fourth object to improve the workability of the case in which the position sensor, the electronic control unit and the automatic transmission are integrated.

In order to achieve the aforementioned objects, the invention has the following characteristics.

(1) There is provided an automatic transmission with an electronic control unit, which comprises an electronic control unit having a transmission control module assembled in a unit case for controlling at least an automatic transmission; and first to fourth members to be fitted such that the electronic control unit is mounted on an automatic transmission case, wherein the first and second members are directed in the same direction as the mounting direction, in which at least the electronic control unit is mounted on the automatic transmission case, and are inserted into the automatic transmission case; the third member is fitted on the first member, and the fourth member is fitted on the second member, and both are individually assembled in the unit case; and a predetermined clearance is formed at a predetermined portion on a mounting path between the automatic transmission case and the unit case.

(2) In the construction as set forth in (1), the clearance is formed at any portion of the mounting path of the automatic transmission case, the first member, the third member and the unit case.

(3) In the construction as set forth in (1) or (2), the clearance can be positioned between the first member and the automatic transmission case or between the third member and the unit case.

(4) In the construction as set forth in (1), (2) or (3), the clearance is perpendicular to the mounting direction.

(5) In the construction as set forth in (1), the predetermined portion can be between the automatic transmission case and the first member.

(6) In the construction as set forth in (1), alternatively, the predetermined portion may be between the unit case and the third member.

(7) In the construction as set forth in (1), (5) or (6), moreover, the predetermined portion is sealed with a face normal to the clearance.

(8) In the construction as set forth in any of (1) to (7), more specifically, the first member is a connector of a wire harness for connecting the electronic control unit and an electric part in the automatic transmission; the second member is a manual shaft for connecting a position sensor and a manual valve in the automatic transmission; the third member is a connector on the side of the unit case; and the fourth member is a position sensor for detecting the range position of the automatic transmission.

(9) In the construction as set forth in (8), the clearance is positioned between the connector of the wire harness and the automatic transmission case.

(10) In the construction as set forth in (8), alternatively, the clearance is positioned between the connector on the side of the unit case and the unit case.

(11) In the construction as set forth in (9), moreover, the clearance between the connector of the wire harness and the automatic transmission case is sealed with a seal member mounted on the automatic transmission case.

(12) In the construction as set forth in (10), on the other hand, the clearance between the connector on the side of the unit case and the unit case is sealed with a seal member mounted on the unit case.

(13) In the construction as set forth in (11), moreover, the connector of the wire harness can include an axial flange portion to be fitted on the connector on the side of the unit case, and a radial flange portion for abutting against the outer face of the automatic transmission case, and a seal member for blocking the inside of the connector of the wire harness from the outside can be arranged on the axial flange portion, and a seal member for blocking the inside of the automatic transmission case from the outside can be arranged on the face, as abutting against the outer face of the automatic transmission case, of the radial flange portion.

(14) In the construction as set forth in (11), (12) or (13), moreover, the seal member can be pushed between members for clamping the seal member by fastening the unit case on the transmission case.

(15) In the construction as set forth in any of (11) to (14), moreover, the seal member is arranged at a position where one of the unit case and the connector of the wire harness is axially overlaid on a portion for pushing the other.

(16) In the construction as set forth in any of (1) to (15), moreover, the wire harness is a collection of wires in the automatic transmission.

(17) Next, there is provided an automatic transmission with an electronic control unit, which comprises an electronic control unit having a transmission control module for controlling an automatic transmission and a position sensor for detecting the range position of the automatic transmission, assembled in a unit case; and four members to be fitted such that the electronic control unit is mounted on an automatic transmission case, that is, a connector of a wire harness to be connected with an electric part in the automatic transmission; a connector on the side of the unit case; a position sensor; and a manual shaft for connecting the position sensor and a manual valve in the automatic transmission, wherein the connector of the wire harness and the manual shaft are directed in the same direction as the mounting direction, in which at least the electronic control unit is mounted on the automatic transmission case, and are inserted into the automatic transmission case; the connector on the side of the unit case is fitted on the connector of the wire harness, and the position sensor is fitted on the manual shaft, and both are individually assembled in the unit case; and a predetermined clearance is formed at a predetermined portion on a mounting path between the automatic transmission case and the unit case.

(18) In the construction as set forth in (17), the clearance is formed at any portion of the mounting path of the automatic transmission case, the connector of the wire harness, the connector on the side of the unit case, and the unit case.

(19) In the construction asset forth in (17), more specifically, the clearance is positioned between the connector of the wire harness and the automatic transmission case or between the connector on the side of the unit case and the unit case.

(20) In the construction as set forth in (17), on the other hand, the clearance is perpendicular to the mounting direction.

(21) In the construction as set forth in (17), on the other hand, the predetermined portion is between the automatic transmission case and the connector of the wire harness.

(22) In the construction as set forth in (17), alternatively, the predetermined portion is between the unit case and the connector of the unit case.

(23) In the construction as set forth in (17), moreover, the predetermined portion is sealed with a face normal to the clearance.

According to the construction as set forth in (1) above, when the unit case of the electronic control unit is mounted on the automatic transmission case by inserting the first and second members simultaneously into the automatic transmission case and by fitting the third and fourth members on the first and second members, the positional deviations among the four members between the automatic transmission case and the unit case are corrected by making use of the clearance formed on the mounting path. Therefore, the electronic control unit can be easily and reliably positioned, as might otherwise requiring the simultaneous fittings of the four members, on the automatic transmission case without any special adjusting works.

Next, the aforementioned effect can be attained in the construction of the invention as set forth in (2) above such that the centering through the second member between the automatic transmission case and the unit case is corrected by making use of the clearance between the automatic transmission case and the first member, between the first member and the third member or between the third member and the unit case.

Next, the aforementioned effect can also be attained in the construction of the invention as set forth in (3) above such that the centering through the second member between the automatic transmission case and the unit case is corrected by making use of the clearance between the automatic transmission case and the first member or between the third member and the unit case.

Next, in the construction of the invention as set forth in (4) above, a sufficient adjustment allowance can be taken for the size of the clearance so that the position correcting effect can be attained by setting a small clearance.

In the construction of the invention as set forth in (5) above, on the other hand, there is not required the positional adjustment of the members to be assembled into the unit case.

In the construction of the invention as set forth in (6) above, on the other hand, there is not required the positional adjustment of the members to be introduced into the automatic transmission case.

In the construction of the invention as set forth in (7) above, on the other hand, the influences from the positional deviation correcting movement of the members in the clearance are not exerted upon the seal portion so that a reliable sealing effect can be attained while setting the clearance in the fitting portions.

In the construction of the invention as set forth in (8) above, on the other hand, simultaneously as the electronic control unit having the position sensor assembled in the unit case is attached directly to the automatic transmission case, there can be performed the necessary mechanical connections between the position sensor and the manual shaft and the electric connections between the transmission control module and the internal electric parts in the automatic transmission.

In the construction of the invention as set forth in (9) above, on the other hand, it is unnecessary to adjust the positions between the position sensor to be assembled in the unit case and the connector on the side of the unit case.

In the construction of the invention as set forth in (10) above, on the other hand, it is unnecessary to adjust the positions between the manual shaft to be inserted into the automatic transmission case and the connector of the wire harness.

In the construction of the invention as set forth in (11) above, on the other hand, the inside of the automatic transmission case can be sealed from the outside. When the electronic control unit is mounted from the upper side on the automatic transmission case, moreover, it is possible to prevent the fall of the seal member for sealing the connector of the wire harness and the automatic transmission case.

In the construction of the invention as set forth in (12) above, on the other hand, the inside of the unit case can be sealed from the outside.

In the construction of the invention as set forth in (13) above, on the other hand, it is possible to seal not only the inside of the automatic transmission case from the outside but also the inside of the unit case from the outside. Moreover, the influences from the positional deviation correcting movement of the members in the clearance are not exerted upon the seal portion so that are liable sealing effect can be attained while setting the clearance in the fitting portions.

In the construction of the invention as set forth in (14) above, on the other hand, the sealing effects can be attained by the pressure of the seal member using the means for fastening the unit case on the automatic transmission case, without any special pressure means for the sealing purpose.

In the construction of the invention as set forth in (15) above, on the other hand, the seal member can be pushed at the same position as its arranged position thereby to improve the sealing effect.

In the construction of the invention as set forth in (16) above, on the other hand, it is possible to realize the wiring structure in which the electronic control unit and the electric parts in the automatic transmission can be wired by a single wire harness. Therefore, the numerous wire harnesses and connectors are not required for the electric connections. Thus, it is possible to reduce the weight and the cost and to reduce the number of mounting design steps and the vehicle assembling steps.

In the construction of the invention as set forth in (17) above, on the other hand, simultaneously as the electronic control unit having the position sensor assembled in the unit case is attached directly to the automatic transmission case, there can be performed the necessary mechanical connections between the position sensor and the manual shaft and the electric connections between the transmission control module and the internal electric parts in the automatic transmission.

On the other hand, the aforementioned effect can be attained in the construction of the invention as set forth in (18) above such that the centering through the manual shaft between the automatic transmission case and the unit case is corrected by making use of the clearance between the automatic transmission case and the connector of the wire harness, between the connector of the wire harness and the connector on the side of the unit case or between the connector on the side of the unit case and the unit case.

On the other hand, the aforementioned effect can also be attained in the construction of the invention as set forth in (19) above such that the centering through the manual shaft between the automatic transmission case and the unit case is corrected by making use of the clearance between the automatic transmission case and the connector of the wire harness or between the connector on the side of the unit case and the unit case.

In the construction of the invention as set forth in (20) above, on the other hand, the influences from the positional deviation correcting movement of the members in the clearance on the mounting path between the automatic transmission case and the unit case are not exerted upon the seal portion so that a reliable sealing effect can be attained while setting the clearance in the fitting portions.

In the construction of the invention as set forth in (21) above, on the other hand, it is unnecessary to adjust the positions between the position sensor to be assembled in the unit case and the connector on the side of the unit case.

In the construction of the invention as set forth in (22) above, on the other hand, it is unnecessary to adjust the positions between the manual shaft to be inserted into the automatic transmission case and the connector of the wire harness.

In the construction of the invention as set forth in (23) above, on the other hand, it is possible to realize the wiring structure in which the electronic control unit and the electric parts in the automatic transmission can be wired by a single wire harness. Therefore, the numerous wire harnesses and connectors are not required for the electric connections. Thus, it is possible to reduce the weight and the cost and to reduce the number of mounting design steps and the vehicle assembling steps.

DESCRIPTION OF THE PREFERRED EMBODIMENTS

Figure 1:
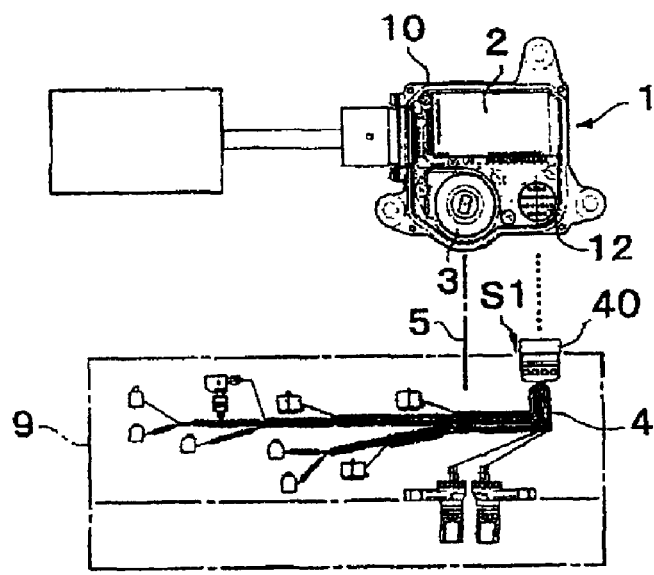
FIG. 1 is a schematic diagram showing a concept of the wiring structure of an automatic transmission according to a first embodiment of the present invention.

With reference to the accompanying drawings, the present invention will be described in connection with its embodiment from its schematic constructions. FIG. 1 shows the relations of the components of the present invention by making them conceptionally schematic. As shown, an automatic transmission with an electronic control unit includes: an electronic control unit 1 having a transmission control module 2 for controlling the automatic transmission assembled in a unit case 10; and first to fourth members or members which are fitted with the electronic control unit 1 being mounted in an automatic transmission case 9. In this embodiment: the first member is a connector 40 of a wire harness for connecting the electronic control unit 1 and electronic parts in the automatic transmission; the second member is a manual shaft (as schematically shown only by a center line) 5 for connecting a position sensor 3 and a manual valve in the automatic transmission; the third member is a connector 12 on the side of the unit case 10; and the fourth member is the position sensor 3 for detecting the range position of the automatic transmission. Of these members: the connector 40 as the first member and the manual shaft 5 as the second member are inserted in the automatic transmission case 9 while being directed in the same direction as that in which the electronic control unit 1 is mounted in the automatic transmission case 9; the connector 12 as the third member on the side of the unit case 10 is fitted on the connector 40 of a wire harness 4; and the position sensor 3 as the fourth member is fitted on the manual shaft 5. And, these members are individually assembled in the unit case 10. According to the characteristic of the present invention, moreover, a predetermined clearance S1 is formed in a predetermined portion of the mounting path between the automatic transmission case 9 and the unit case 10, as will be detailed hereinafter. The predetermined portion in the case of this embodiment is located between the automatic transmission case 9 and the connector 40 so that the predetermined clearance S1 is positioned between the automatic transmission case 9 and the connector 40.

Figure 2:
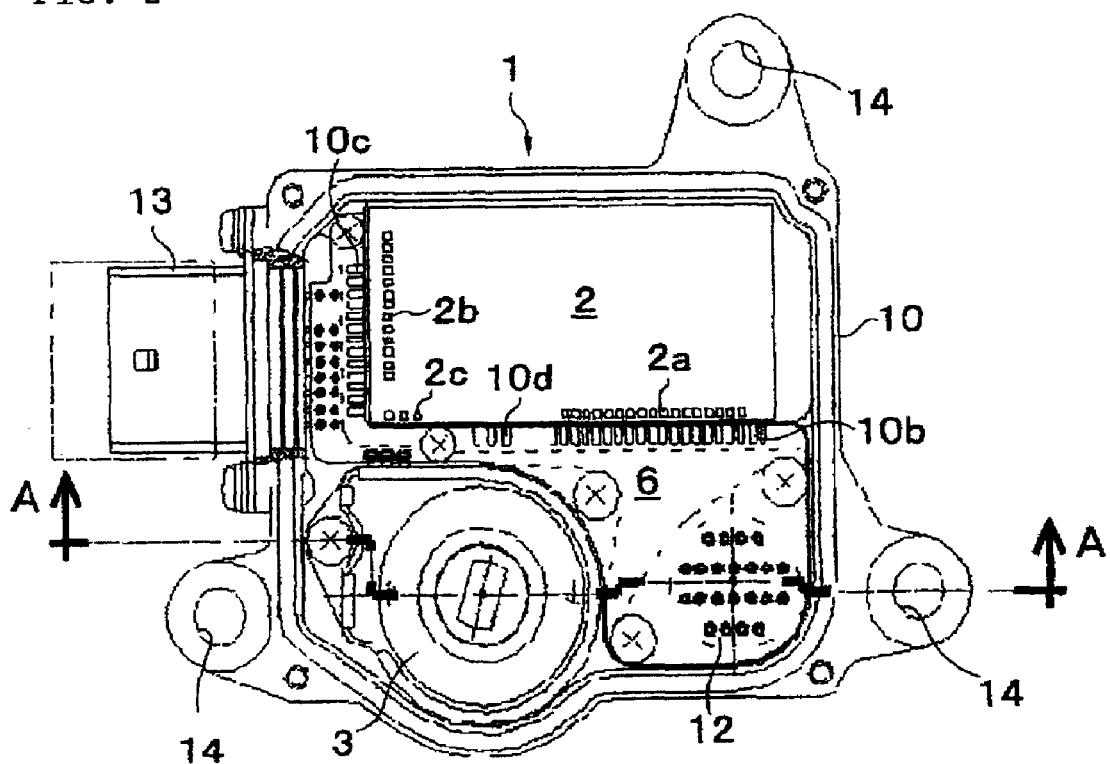
FIG. 2 is a top plan view of a shift control unit of the embodiment.
Figure 3:
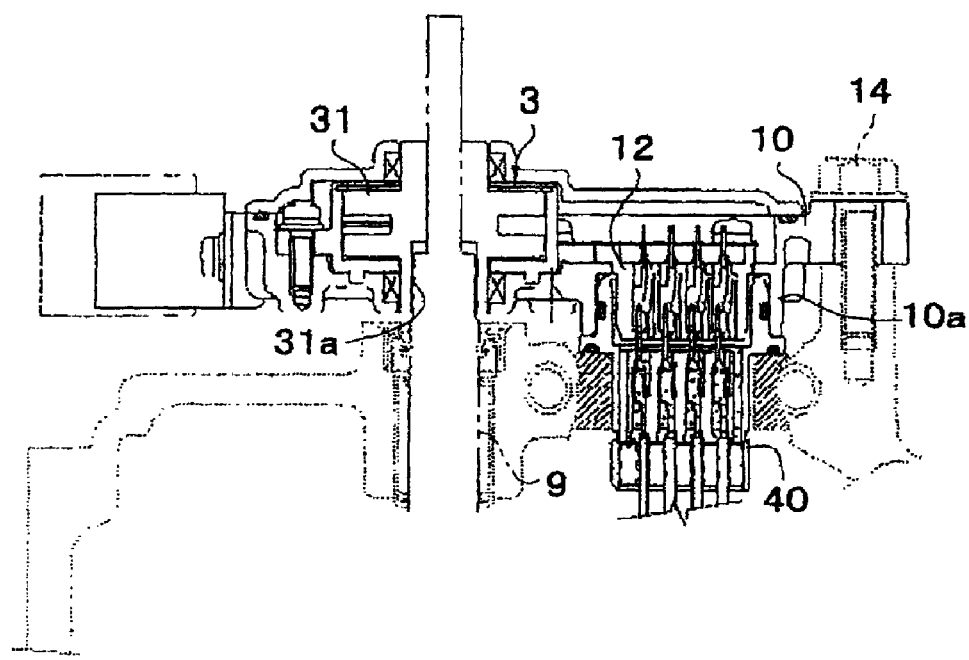
FIG. 3 is an A—A section of FIG. 2.

In the detailed structure, as shown in a top plan view and in its section A—A of FIG. 2 and FIG. 3, the electronic control unit 1 is so constructed that the transmission control module 2 and the position sensor 3 are assembled in the common unit case 10 and a connected by joint means such as a wire bonding method or a solder. The connector 12 is so arranged adjacent to the position sensor 3 as to be directed toward the side (as seen on the lower side of FIG. 3), on which the unit case 10 of the electronic control unit 1 is mounted on the automatic transmission case 9. Moreover, this connector 12 is directed in the same direction as that of an engagement portion 31a for fitting a rotating member 31 of the position sensor 3 on the manual shaft 5 as its actuation member, as indicated by imaginary lines in FIG. 3.

The individual portions will be described in more detail. With reference to FIG. 2 and FIG. 3, the transmission control module 2 is constructed so as to improve the reliability in the environmental resistance by arranging the individual circuit chips composed mainly of a microcomputer over a ceramics substrate or a refractory substrate, e.g., by arranging three circuit terminal groups 2a, 2b and 2c which are integrated along the two sides of the substrate. In the unit case 10, moreover, there is arranged the wiring substrate such as a flexible substrate and a wiring member, which are shaped to cover substantially the entire face of the unit case 10 excepting the face arranging the transmission control module 2 and the position sensor 3. Over this flexible substrate 6 and along its two sides, there are arranged three circuit terminal groups 10b, 10c and 10d which correspond to the aforementioned three circuit terminal groups 2a, 2b and 2c. The circuit terminal groups 10b, 10c and 10d are provided as the wiring lines in the flexible substrate 6 and in the plural number of the position sensors 3. This number is different according to the system of the position sensors. The circuit terminal groups are led to such joint hole positions that they can be connected with usually three or more terminals and the numerous input/output terminals of connectors 12 and 13. Of these two connectors 12 and 13, the connector 12, as directed normal to the sheet of FIG. 2, is to be connected with the connector 40 of the wire harness 4 according to the gist of the present invention, and the connector 13, as directed in parallel with the sheet, is to be connected through the wire harness on the vehicle side with a vehicle system such as the electronic control unit or the vehicle control unit.

The terminals of the position sensor 3 and the numerous input/output terminals of the connectors 12 and 13 are individually exemplified by upright pins and adopt the connection structure in which the individual pins are inserted in the individual joint holes by covering them with the flexible substrate 6. The errors between the pin positions and the joint hole positions at the connecting time are absorbed by the deflection of the flexible substrate 6. The individual circuit terminal groups 2a, 2b and 2c of the circuit substrate are connected by the wire bonding method with the corresponding circuit terminal groups 10b, 10c and 10d of the flexible substrate 6, and the jointed portions of the upright pins inserted in the joint holes of the flexible substrate 6 are fixed by means of the solder or a conductive adhesive.

Next, the position sensor 3 is of a non-contact sensor of: an analog type, in which the positional change of a magnet attached to a disc-shaped rotating member 31 is detected in terms of a change in the magnetic flux density using a Hall IC as the detection element so that the range position is indexed in response to the change in the output voltage by deciding the voltage value and the range position determined correspondingly with a microcomputer; or a digital type in which a plurality of detection elements of similar Hall ICs are arranged so that the range position is indexed by deciding the combination of signals outputted from the individual detection elements according to the positional changes of the magnets with a microcomputer. The non-contact of the sensor 3 makes unnecessary the structure in which a number of contacts are concentrically arranged, unlike the contact type position sensor of the related art having an integrated neutral switch. This unnecessariness makes it possible to reduce the size of the position sensor drastically. As a result, the whole size of the electronic control unit 1 is reduced to mount the electronic control unit 1 directly on the transmission case 9 in the restricted arrangement space. Here, this position sensor is of the type in which the range position is indexed by the decision with the microcomputer, as described above. Therefore, the neutral start switch is constructed by another means having a switching circuit assembled in the transmission control module 2. The rotating member 31 of the position sensor 3 has an axial bore of such a width across flats in its center stem as to fit the manual shaft 5 irrotationally.

Figure 4:
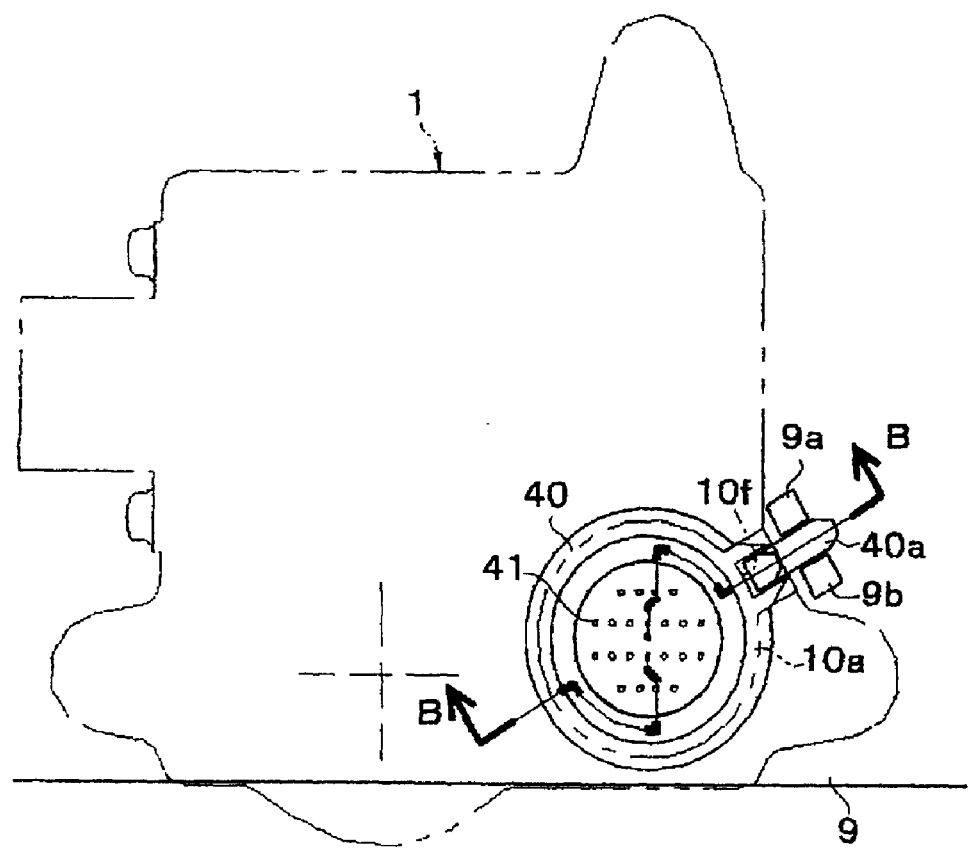
FIG. 4 is a top plan view of a rotation stopping structure of a wire harness of the embodiment.
Figure 5:
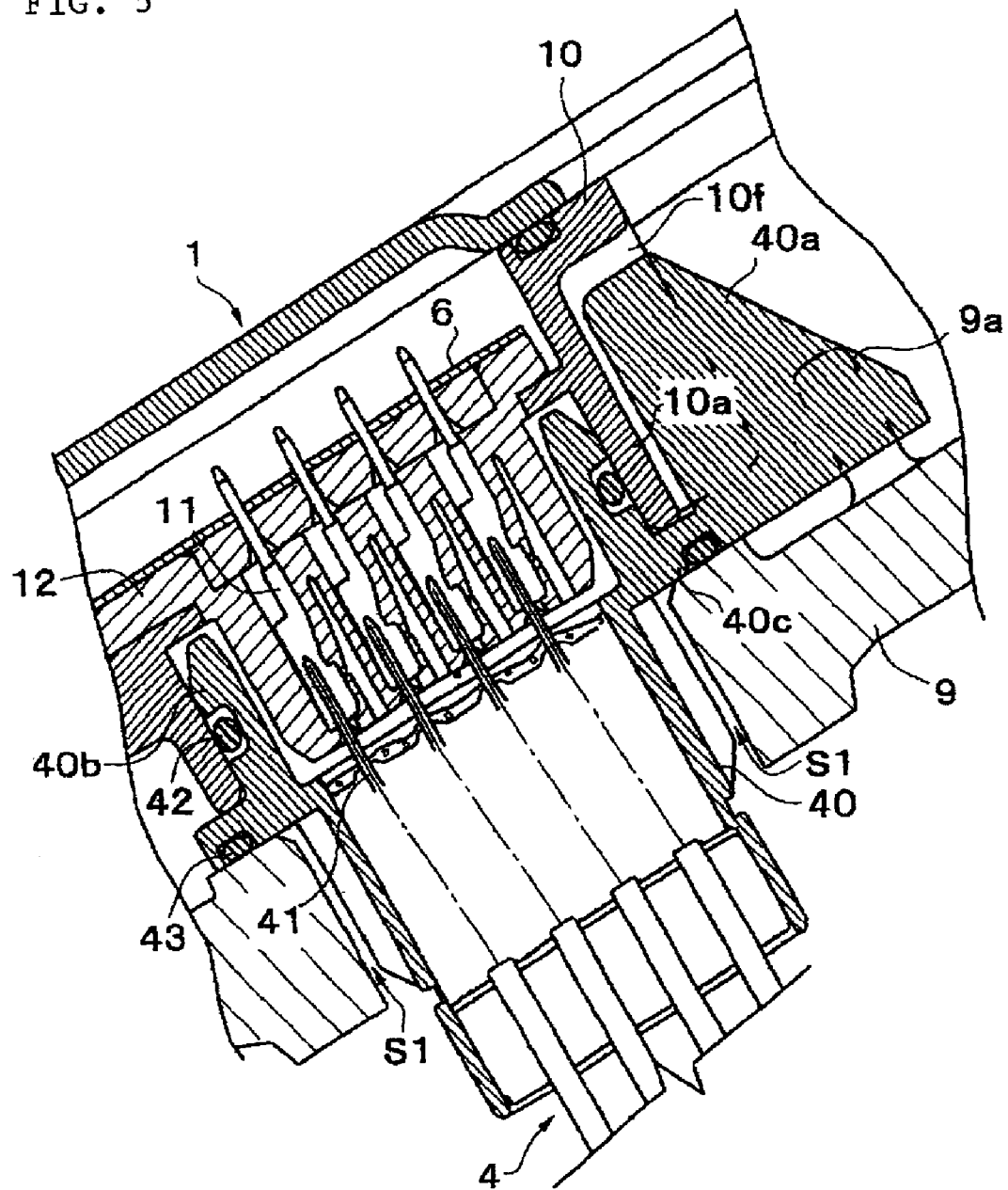
FIG. 5 is a B—B section of FIG. 4.

With reference to FIG. 4 and FIG. 5, the connector 40 of the wire harness 4 to be fitted on the connector in a connector portion 10a of the unit case 10 has a rotation stopper portion 40a to engage with the outer face of the automatic transmission case 9 and the outer face of the unit case 10. As shown in a top plan view in FIG. 4, the rotation stopper portion 40a is constructed to have such a structure that it extends in a plate shape radially from the circumference of the connector 40, that the engagement portion to engage with the rotation stopper portion 40a on the side of the automatic transmission case 9 is formed into a pair of protrusions 9a and 9b protruding from the outer face of the case 9, and that the rotation stopper portion 40a is held in a fittable spacing between the protrusions 9a and 9b. The engagement portion on the side of the unit case 10 is formed into an axial groove 10f which is formed in the band-shaped ridge protruded from the outer circumference of the connector portion 10a of the unit case 10 and having a width to fit the rotation stopper portion 40a.

The connector 40 of the wire harness 4 is provided with an axial flange portion 40b to be fitted on the connector 12 in the connector portion 10a of the unit case 10, and a radial flange portion 40c to abut against the outer face of the automatic transmission case 9. In the axial flange portion 40b, there is arranged a seal member 42 made of an O-ring, which is fitted in the seal ring groove in this embodiment sealing the inside of the connector portion 10a from the outside. In the face of the radial flange portion 40c to abut against the outer face of the automatic transmission case 9, there is arranged a seal member 43 which is fitted in the seal ring groove for sealing the inside of the automatic transmission case 9 from the outside.

Between the connector 40 and the opening of the automatic transmission case 9, on the other hand, there is formed the predetermined clearance S1 according to the characteristic of the present invention. This clearance S1 is provided for avoiding the assembling difficulty, as might otherwise be caused by the transverse shift or inclination of the connector 40 due to the unavoidable working error (or dispersion) in: the positional relation between the axis of the connector 12 on the side of the unit case 10 and the axis of the opening of the automatic transmission case, as viewed from the axis of the manual shaft 5 (as referred to FIG. 3) to be fitted on the rotating member 31 of the position sensor 3; or the squareness of the mounting faces of the automatic transmission case 9 and the unit case 10 with respect to the axis of the manual shaft 5. Therefore, the clearance S1 is sized to such a radial width as can absorb the individual product errors. The construction, in which the seal member 43 is arranged in the radial flange portion 40c of the connector 40 in relation to the setting direction (to extend axially around the connector 40) of the clearance S1, is different from that in which the axial seal member is arranged between the outer circumference of the connector 40 and the opening of the automatic transmission case 9, and retains a high sealing property because it is not influenced by the transverse shift of the connector 40 for absorbing the dispersion but can keep a predetermined crushing deformation as the unit case 10 is fastened on the automatic transmission case by means of bolts 14.

Into the connector portion 10a arranged adjacent to the position sensor 3, there is arranged the connector 12 on the side of the electronic control unit 1 by screwing and fixing its radial flange portion in the unit case 10. The connector 12 is exemplified by a female connector in this embodiment and is centered by fitting it in the opening portion of the unit case 10.

The electronic control unit I and the wire harness 4 having such structures are assembled in the automatic transmission case 9 by any of the following procedures. First of all, according to a first procedure, the wire harness 4 is set in the transmission by inserting the leading end side of the wire harness 4 into the opening of the transmission case 9 and by applying the radial flange portion 40c of the connector 40 on the root end side to the outer side of the transmission case 9. As a result, the rotation stopper portion 40a comes into engagement with the two protrusions 9a and 9b on the side of the transmission case 9 so that it is stopped in rotation to position the connector 40 in the rotating direction. At this time, the predetermined clearance S1 is left between the outer circumference of the connector 40 and the opening of the transmission case 9 so that the movable state of the connector 40 in the radial direction is kept.

After this, the axial flange portion 40b of the connector 40 is fitted on the connector 12 of the connector portion 10a of the unit case 10 by applying the electronic control unit 1 to the outer side of the transmission case 9 with the axis of the rotating member 31 of the position sensor 3 being aligned with the axis of the manual shaft 5, as shown in FIG. 3. In the connector portion 10a, a female type input/output terminal 11 on the side of the electronic control unit 1 and a male type input/output terminal 41 on the side of the connector 40 are centered by the transverse shift of the axial displacement of the connector 40, and the seal member 42 around the axial flange portion 40b is pressed onto the inner circumference of the connector portion 10a to seal up the inside and the outside of the connector portion 10a.

In the state in which the connections of the two input/output terminals 11 and 41 are thus established, the electronic control unit 1 is fixed on the automatic transmission case 9 by fastening the bolts 14. As a result, the seal member 43 of the radial flange portion 40c of the connector 40 is pressed onto the outer face of the transmission case 9 so that the transmission case is sealed up internally and externally. At this time, the leading end of the connector portion 10a abuts against the radial flange portion 40c of the connector 40 and acts as a push portion to push the seal member 43 onto the automatic transmission case 9 through that flange portion 40c thereby to transmit the fastening force. Thus, flange portion 40c and transmission case 9 serve as "clamping members" by clamping seal member 43 therebetween. On the other hand, this push portion transmits the pushing force at a position where it axially overlaps the seal member 43, i.e., at a similar radial position so that a sufficient sealing effect can also be achieved by fastening the bolts 14 at a different position.

According to a second procedure, the manual shaft 5 and the connector 40 are mounted in advance on the electronic control unit 1. Then, the electronic control unit 1 is applied to the automatic transmission case 9 by introducing the leading end side of the wire harness 4 mounted on the electronic control unit 1 into the transmission case 9 through the opening of the transmission case 9, by adjusting the position of the manual shaft 5 to the insertion opening of the manual shaft 5 of the automatic transmission case 9, by fitting the rotation stopper portion 40a of the connector 40 between the two protrusions 9a and 9b of the transmission case 9 and by inserting the manual shaft 5 and the connector 40 into the two openings of the automatic transmission case 9. By these works, the connector 40 is fixed in position on the outer face of the automatic transmission case 9 with neither twist nor inclination but with an allowance of the clearance S1 from the opening of the automatic transmission case 9 while being regulated from rotations by the two protrusions 9a and 9b. In this case, too, the electronic control unit 1 is fixed on the transmission case 9 by fastening the bolts 14. As a result, the seal member 43 of the radial flange portion 40c of the connector 40 is pressed onto the outer face of the transmission case 9 to seal up the transmission case internally and externally. In the case of this procedure, moreover, the manual shaft 5 is then mechanically connected to the manual valve assembled in the valve body of the automatic transmission, and the individual connectors on the leading end sides of the wire harness 40 are connected with the connector of a solenoid assembled in the valve body and the connectors of the various sensors assembled in the individual portions of a transmission mechanism.

Figure 6:
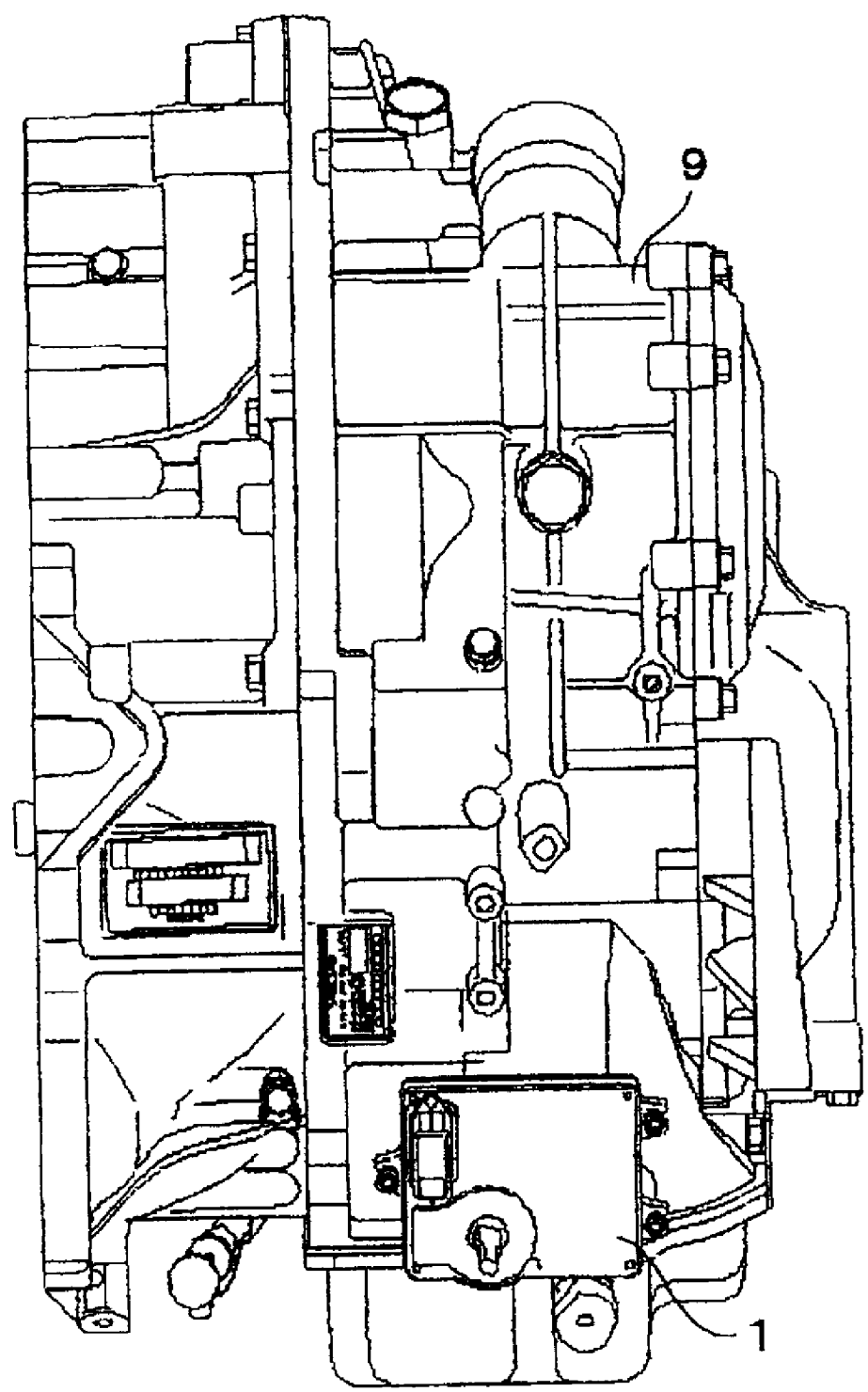
FIG. 6 is a side elevation showing the state in which the shift control unit of the embodiment is mounted on the transmission body.

Thus, the electronic control unit 1 is mounted on the outer face of the transmission case 9. In the case of the aforementioned first procedure, there are simultaneously performed not only the connection between the two connectors 40 and 12, the sealing of the connected portions from the outside, and the sealing of the opening of the transmission case but also the connected of the rotating member 31 of the position sensor 3 to the manual shaft 5. In the case of the second procedure, on the other hand, there are simultaneously performed the sealing of the opening of the automatic transmission case 9 and the insertion of the manual shaft 5 into the opening of the automatic transmission case 9. By the mounting operation of either of the aforementioned procedures, the transmission case 9 and the electronic control unit 1 are integrated, as shown in an exterior view in FIG. 6.

In the mounting structure thus constructed, it is unnecessary to lead the numerous wire harnesses inefficiently and to use many connectors for the electric connections, and there are reduced not only the weight of and the cost for the automatic transmission but also the numbers of mounting designs and vehicle assembling steps. Moreover, the automatic transmission body and its electronic control unit 1 are assembled before mounted on the vehicle and can be managed as the integral product, so that the quality management to be made by the one-to-one fine tuning can be facilitated while considering the dispersion of the characteristics among the individuals. Moreover, the electric parts such as the various sensors, solenoid and position sensors 3 of the automatic transmission and the electronic control unit 1 are collectively arranged so that the space reduction can be realized while considering the space saving synthetically. In the case where the position sensors 3, the transmission control module 2 and the automatic transmission are integrated, still moreover, it is possible to remarkably improve the workabilities in the electric connection between the transmission control module 2 and the automatic transmission and the mechanical connection between the position sensors 3 and the automatic transmission.

Figure 7:
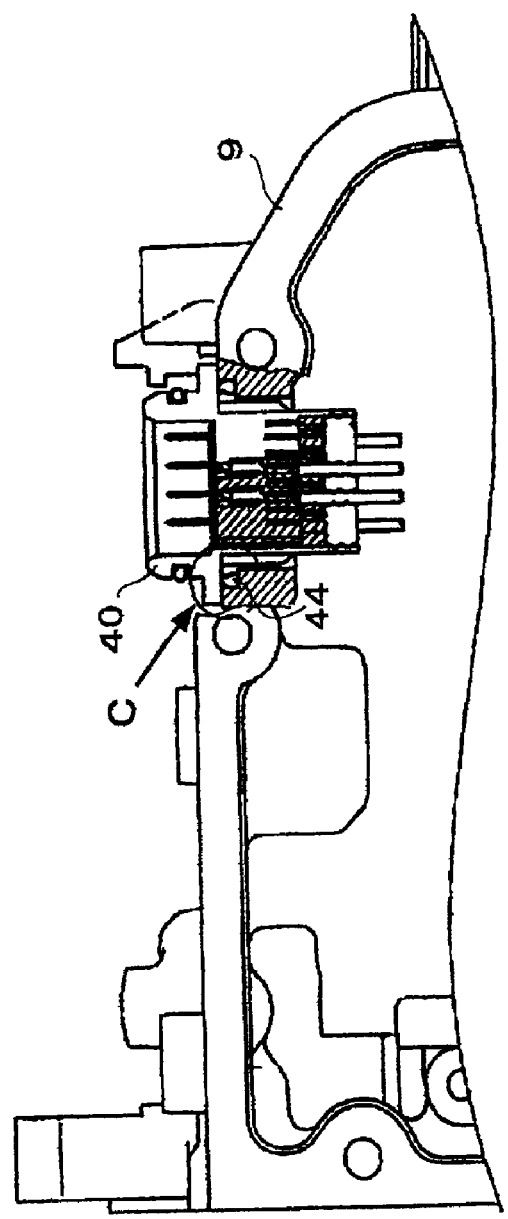
FIG. 7 is a partial section showing a structure, in which an electronic control unit according to a second embodiment of the present invention is mounted on a transmission case.
Figure 8:
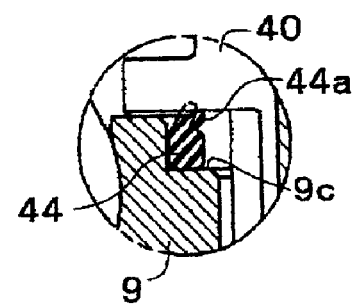
FIG. 8 is an enlarged view of a portion C of FIG. 7.

Next, FIG. 7 and FIG. 8 show a second embodiment of the present invention. This embodiment is modified from the foregoing first embodiment in the sealing structure between the automatic transmission case 9 and the connector 40. In the case of this embodiment, at a corner of the of the connector insertion opening of the automatic transmission case 9, there is formed a notch 9c, which is used as a fitting portion to arrange a seal ring 44.

In the seal ring 44 of this embodiment, as enlarged and shown in detail in FIG. 8, there is formed a lip portion 44a which is extended at an upward inclination from the upper face toward the radially inner side of a body portion which is made of an elastic member of rubber or the like having a generally rectangular section. This lip portion 44a takes a rising position, as shown by an imaginary line, in an incompressive state so that it is deformed into a fallen sectional shape, as shown, as the connector 40 is compressed. In this state, the lip portion 44a contacts in a suitable elasticity with the radial flange portion of the connector 40.

The use of the seal ring 44 of this embodiment is advantageous in that the possibility of the seal ring 44 to fall at the time of assembling the electronic control unit 1 is eliminated by the large weight, because the seal ring 44 is set on the side of the automatic transmission case 9 which is supposed to be set in the position having the opening directed upward for the assembly of the electronic control unit 1. In this lip seal structure different from the seal structure using an O-ring having a sealing effect determined mainly by the initial crushing force, on the other hand, the pressure is applied to the lip portion 44a so that the compression on the sealing face is increased to provide an advantage that the sealing effect is improved as the internal pressure of the automatic transmission case 9 rises.

Figure 9:
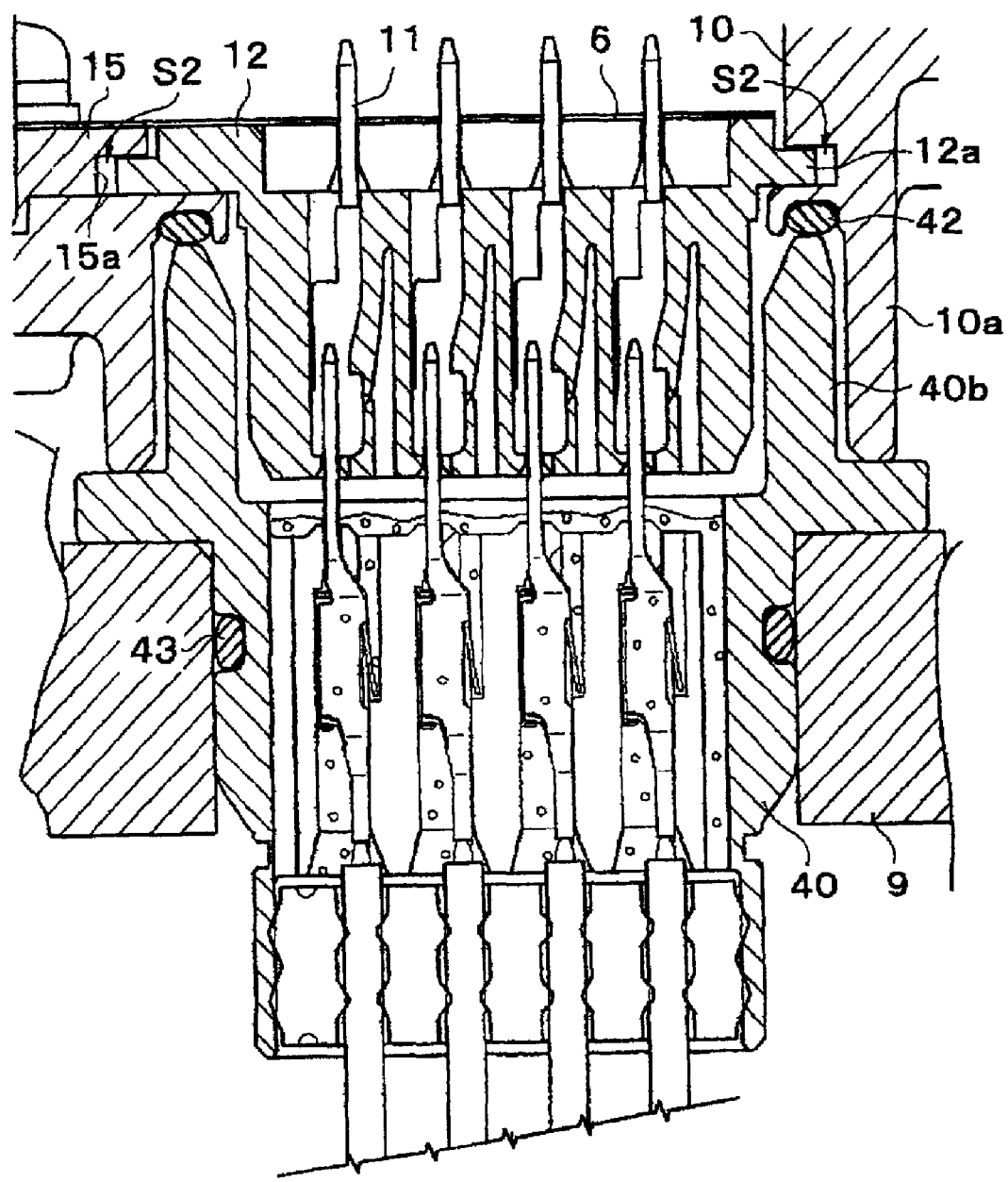
FIG. 9 is a partial section showing a structure in which an electronic control unit according to a third embodiment of the present invention is mounted on the transmission case.
Figure 10:
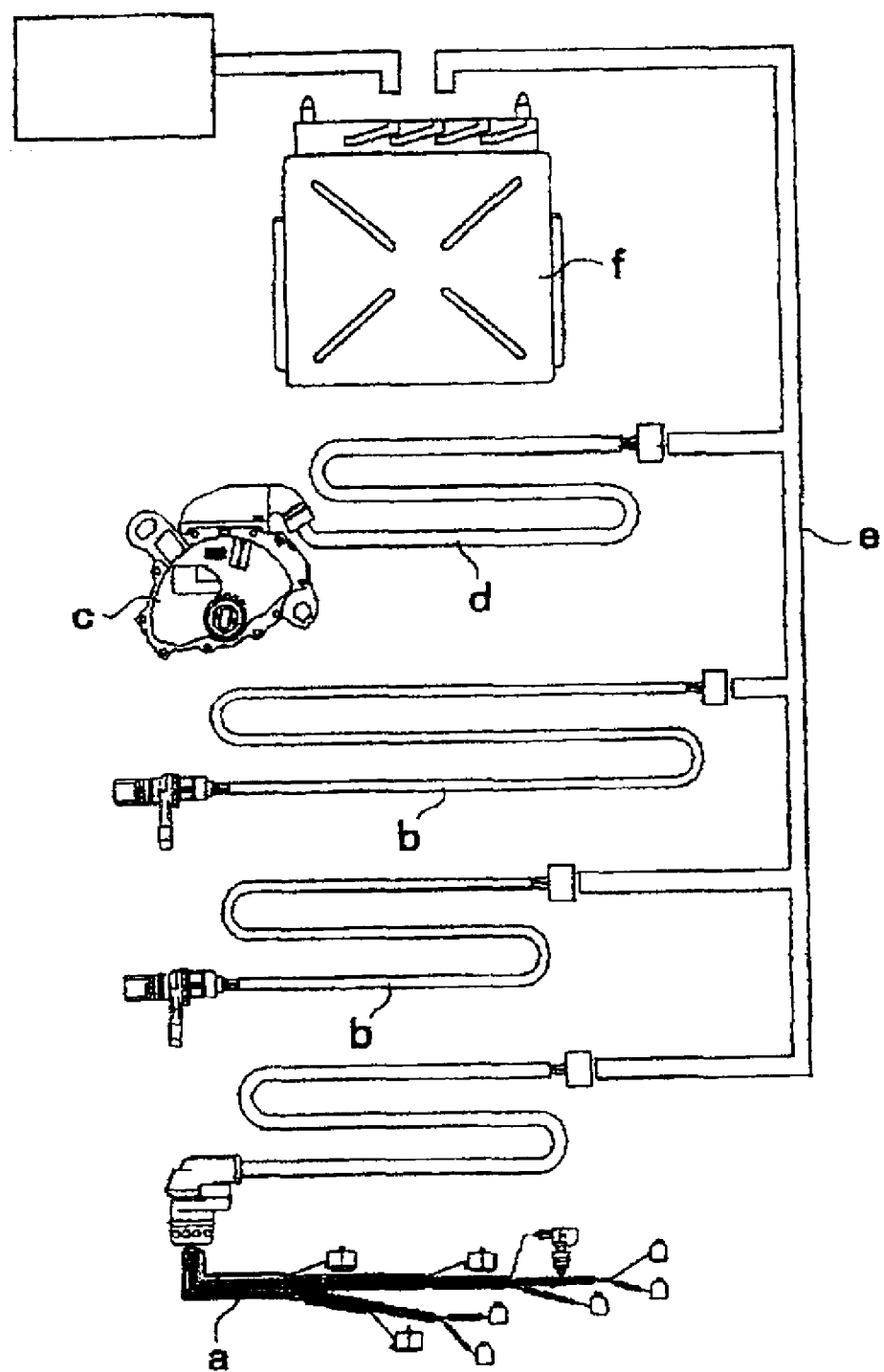
FIG. 10 is a schematic diagram showing a concept of the wiring structure of an automatic transmission of the related art.

Finally, FIG. 9 shows a third embodiment of the present invention. This embodiment is so modified from the foregoing first embodiment that the setting position of the clearance is changed. In this embodiment, a clearance S2 is set between the unit case 10 and the connector 12 on the side of the unit case. Here will be described the difference from the first embodiment.

The fitting portion in this embodiment between the opening of the automatic transmission case 9 and the connector 40 is set in the internal/external diameter relation considering only the fitting range having no allowing for the positional adjustment, and the clearance S2 is set in place between the connector 12 and the unit case 10. In order to position the male connector 40 on the side of the automatic transmission case 9 and the pins 41 and 11 of the female connector 12 on the side of the unit case 10, more specifically, the female connector 12 an move to an extent corresponding to the clearance S2 in the radial direction with respect to the unit case 10. The radial width of the clearance S2 is so sized like the clearance S1 of the first embodiment as to absorb the individual product errors. Although a variety of modes can be adopted as the movable construction of this case, there is used in this embodiment a structure in which a flange portion 12a bulging radially from the female connector 12 is provided and is fitted in a notch 15a formed in a stationary member 15 on the side of the unit case 10. In this case, too, the positional deviation, as caused by the transverse shift of the female connector 12, of the pin 11 of the connector 12 with respect to the wires of the transmission control module fixed in the unit case 10 is absorbed by the flexibility of the flexible substrate.

In the case of this embodiment, moreover, the fitting relation between the automatic transmission case 9 and the connector 40 causes no radial shift at the mounting time. Therefore, the seal at this portion is an axial one in which the O-ring to be fitted in the outer circumferential groove of the connector 40 is used as the seal member 43. On the contrary, the fitting relation between the unit case 10 and the connector 12 is accompanied by the radial shift at the mounting time. Therefore, the seal at this portion is the radial seal which is composed of the seal member 42 interposed between the unit case 10 and the connector 40, that is, the seal structure for blocking the radial flow normal to the cylindrical fitting face through the clearance S2. The remaining constructions are substantially similar to those of the first embodiment, and their descriptions will be omitted by designating the corresponding members by similar reference numerals.

In this embodiment, too, it is possible to mount the electronic control unit case 10 on the automatic transmission according to the assembling procedure which has been described in connection with the foregoing first embodiment. In the case of this embodiment, however, according to the first procedure, the female connector 12 is moved to the position aligned in the clearance S2 with the male connector 40 by the fitting relation with the pin 41 of the male connector 40, as positioned in advance on the side of the automatic transmission case 9. In short, the member to be positionally corrected in the clearance is one reversed from that of the case of the first embodiment. As a result, the two connectors 12 and 40 are fitted on each other so that the unit case 10 is mounted without any difficulty on the automatic transmission case 9. After this, the unit case 10 is fastened and fixed on the automatic transmission case 9 by means of the bolts 14 so that the seal member 42 is axially pushed to establish the radial seal between the unit case 10 and the leading end of the axial flange portion 40b of the connector 40.

In the case according to the second procedure, on the other hand, the mutual connection between the connectors 40 and 12 has already been completed. When the male connector 40 is inserted into the automatic transmission case 9 in accordance with the assembly of the unit case 10, therefore, only the transverse shift occurs only in the clearance S2 of the female connector 40 in accordance with the positional adjustment between the opening of the automatic transmission case 9 and the male connector 40 so that the unit case 10 is mounted without any difficulty on the automatic transmission case 9. The remaining points are similar to those of the case according to the first procedure.

In short, the difference between this third embodiment and the preceding first embodiment resides in the difference between the setting positions of the clearances S1 and S2. In the case where the clearance S2 is set between the unit case 10 and the connector 12, as contrary to the case where the clearance S1 is set between the automatic transmission case 9 and the connector 40, too, similar effects can be achieved even if the seal construction is reversed from the arrangement of the first embodiment, i.e., the reversed construction in the radial seal structure and the axial seal structure, i.e., the construction in which the radial seal structure is used for sealing the clearance portion.

Although the present invention has been described in detail in connection with the three embodiments, it should not be limited to those embodiments it can be practiced in various modifications of the specific construction within the scope of the claims. Throughout all the embodiments, for example, the connection between the position sensor 3 and the manual value in the automatic transmission has been exemplified by the mechanical connection through the manual shaft 5. In the case where this connection is exemplified by a electric wire connection, however, the present invention can be practiced by exemplifying the second member by a connector for the electric connection and the first member by a connector for establishing a similar electric connection. Where the first member is exemplified by the mechanical connection member such as the manual shaft and where the second member is exemplified by the connector for the electric connection, on the other hand, the first and second members are only in parallel with each other but at the different axial positions. However, the present invention can also be applied to the construction in which the two members are common in axes and in parallel in the coaxial relation. Therefore, the constructions for realizing the scope of the claims belong to the present invention, not matter whether the first and second members might be the mechanical connection member or the electric connection members, while including the case in which they are optical connection members such as optical fibers, and no matter whether the two or not the two members might have common axes.

What is claimed is:

1. An automatic transmission with an electronic control unit,
   wherein the automatic transmission comprises:
     an automatic transmission case member;
     first and second members extending from a wall of the automatic transmission case member toward the electronic control unit; and
   wherein said electronic control unit comprises:
     a transmission control module for controlling at least the automatic transmission;
     a unit case member housing the transmission control module;
     a third member mounted within the unit case member and engaged with the first member, the engagement between the first member and the second member being an electrical connection
     a fourth member mounted within the unit case member and engaged with the second member; and
   wherein one of said members is encircled by a second of said members with a circumferential clearance therebetween.

2. The automatic transmission with an electronic control unit according to claim 1 wherein said clearance surrounds and separates one of the first, second, third and fourth members from the wall of the automatic transmission case member or the wall of the unit case member.

3. The automatic transmission with an electronic control unit according to claim 2 wherein the wall of the transmission case member extends between the automatic transmission and the electronic control unit.

4. The automatic transmission with an electronic control unit according to claim 2 wherein said clearance allows axial alignment of engaged members.

5. The automatic transmission with an electronic control unit according to claim 1 wherein the wall of transmission case member extends between the automatic transmission and the electronic control unit.

6. The automatic transmission with an electronic control unit according to claim 1 wherein said clearance allows axial alignment of engaged members.

7. The automatic transmission with an electronic control unit according to claim 1, wherein said clearance is formed between (1) the automatic transmission case member or the unit case member and (2) the first member or the third member and the unit case member.

8. The automatic transmission with an electronic control unit according to claim 7, wherein said clearance extends in the same direction as said first and second members.

9. The automatic transmission with an electronic control unit according to claim 7, wherein said clearance is between the first member and the wall of the automatic transmission case member or between the third member and a wall of the unit case member.

10. The automatic transmission with an electronic control unit according to claim 9, wherein said clearance is between the wall of the automatic transmission case member and the first member.

11. The automatic transmission with an electronic control unit according to claim 10, wherein the first member has a face normal to said clearance and a seal surrounding the face.

12. The automatic transmission with an electronic control unit according to claim 11, wherein said first member is a connector of a wire harness for connecting the electronic control unit and an electric part in the automatic transmission; the second member is a manual shaft for connecting a position sensor and a manual valve in the automatic transmission; the third member is a connector on the side of the unit case member; and the fourth member is a position sensor for detecting the range position of the automatic transmission.

13. The automatic transmission with an electronic control unit according to claim 12, wherein said clearance is positioned between the connector of the wire harness and the wall of the automatic transmission case member.

14. The automatic transmission with an electronic control unit according to claim 13, wherein said clearance between the connector of said wire harness and the wall of the automatic transmission case member is sealed with a first seal member mounted on the wall of the automatic transmission case member.

15. The automatic transmission with an electronic control unit according to claim 14, wherein the connector of said wire harness includes an axial flange portion to be fitted on the connector on the side of the unit case member, and a radial flange portion for abutting against the outer face of the wall of the automatic transmission case member; a second seal member for blocking the inside of the connector of the wire harness from the outside is arranged on the axial flange portion; and a seal member for blocking the inside of the automatic transmission case member from the outside is arranged on the face of the radial flange portion which abuts against the outer face of the wall of the automatic transmission case member.

16. The automatic transmission with an electronic control unit according to claim 15, wherein said seal member is pushed between members for clamping the seal member by fastening the unit case on the wall of the transmission case member.

17. The automatic transmission with an electronic control unit according to claim 16, wherein said seal member is arranged at a position where one of the unit case member and the connector of the wire harness is axially overlaid on a portion for pushing the other.

18. The automatic transmission with an electronic control unit according to claim 9, wherein said first member is a connector of a wire harness for connecting the electronic control unit and an electric part in the automatic transmission; the second member is a manual shaft for connecting a position sensor and a manual valve in the automatic transmission; the third member is a connector on the side of the unit case member; and the fourth member is a position sensor for detecting the range position of the automatic transmission.

19. The automatic transmission with an electronic control unit according to claim 9, wherein said clearance is between the wall of the unit case member and the third member.

20. The automatic transmission with an electronic control unit according to claim 19, wherein a member around which said clearance is provided is sealed around a face normal to the clearance.

21. The automatic transmission with an electronic control unit according to claim 20, wherein said first member is a connector of a wire harness for connecting the electronic control unit and an electric part in the automatic transmission; the second member is a manual shaft for connecting a position sensor and a manual valve in the automatic transmission; the third member is a connector on the side of the unit case member; and the fourth member is a position sensor for detecting the range position of the automatic transmission.

22. The automatic transmission with an electronic control unit according to claim 21, wherein said clearance is between the connector on the side of the unit case member and the wall of the unit case member.

23. The automatic transmission with an electronic control unit according to claim 22, wherein said clearance between the connector on the side of said unit case member and the unit case member is sealed with a seal member mounted on the wall of the unit case member.

24. The automatic transmission with an electronic control unit according to claim 1, wherein said clearance extends in the same direction as the first and second members.

25. The automatic transmission with an electronic control unit according to claim 1, wherein said clearance is between the first member and the wall of the automatic transmission case member or between the third member and the wall of the unit case member.

* * * * *